March 17, 1942. G. A. SMITH 2,276,886
HAIR AND SCALP CLEANING DEVICE
Filed May 1, 1939 4 Sheets-Sheet 1

INVENTOR.
George A. Smith
BY Chapman Ferguson
ATTORNEY.

March 17, 1942.  G. A. SMITH  2,276,886
HAIR AND SCALP CLEANING DEVICE
Filed May 1, 1939  4 Sheets-Sheet 2

INVENTOR.
George A. Smith
BY
Chapman Ferguson
ATTORNEY.

March 17, 1942.   G. A. SMITH   2,276,886
HAIR AND SCALP CLEANING DEVICE
Filed May 1, 1939   4 Sheets-Sheet 3
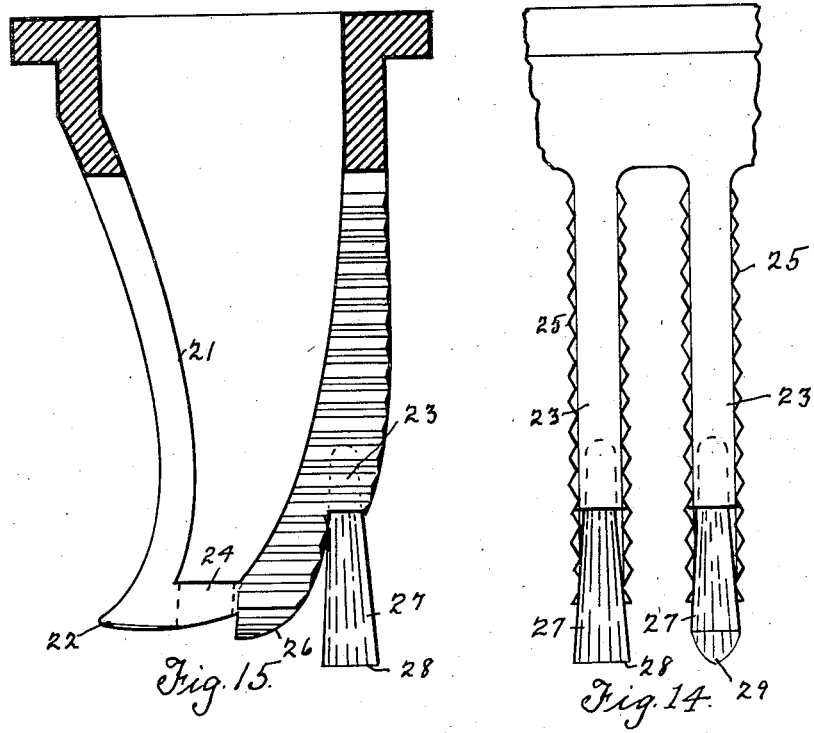
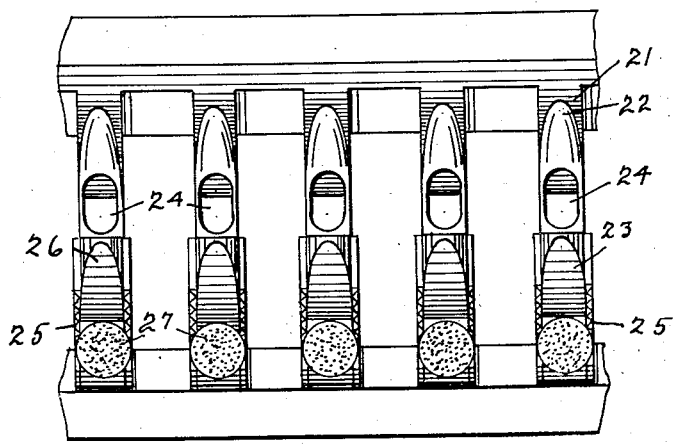
INVENTOR.
George A. Smith
BY Chapin a Ferguson
ATTORNEY.

March 17, 1942. G. A. SMITH 2,276,886
HAIR AND SCALP CLEANING DEVICE
Filed May 1, 1939 4 Sheets-Sheet 4
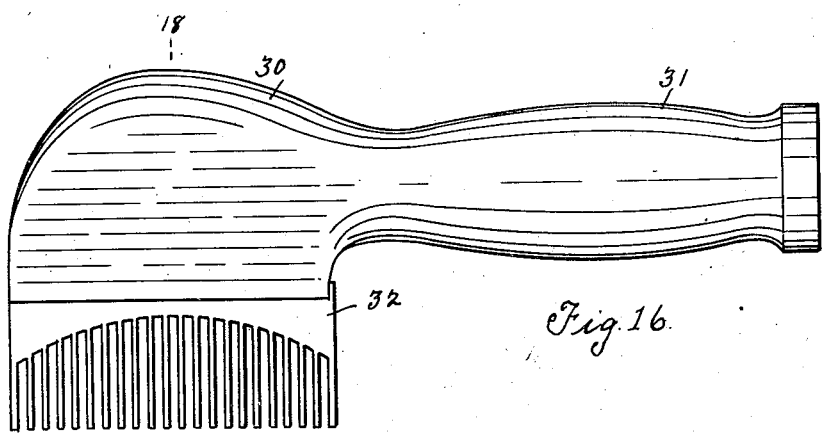
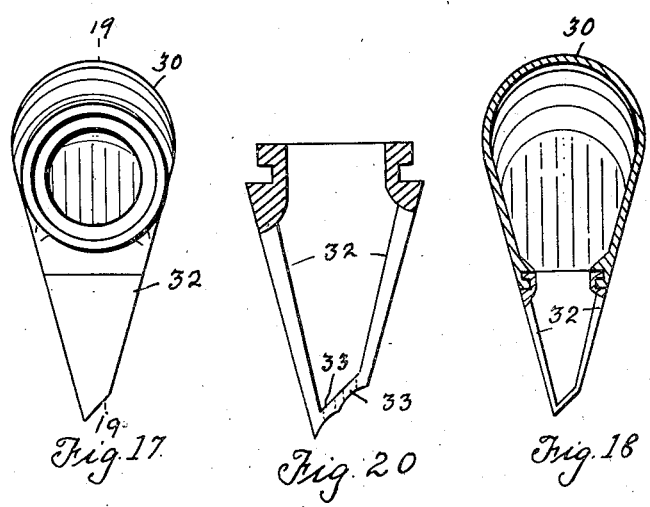
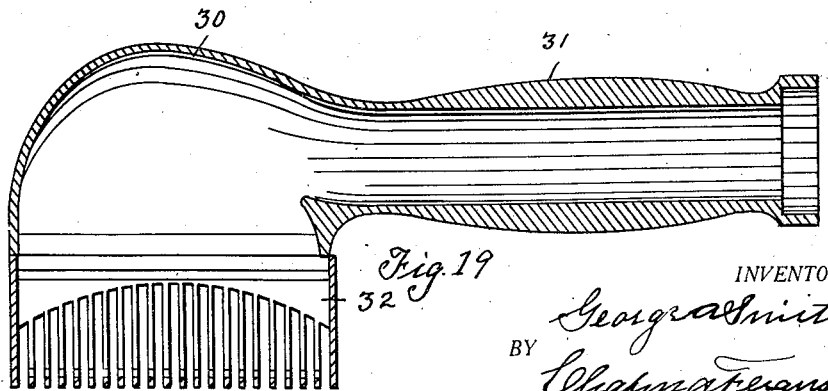
INVENTOR.
George A. Smith
BY Chapman Ferguson
ATTORNEY.

Patented Mar. 17, 1942

2,276,886

UNITED STATES PATENT OFFICE 2,276,886

HAIR AND SCALP CLEANING DEVICE

George A. Smith, Baltimore, Md.

Application May 1, 1939, Serial No. 271,195

6 Claims. (Cl. 128—297)

This invention relates to a device for cleaning the hair and is a modification of my invention, application for patent for which was filed by me on June 24, 1938, Serial No. 215,671.

The object of the invention is to provide a device for removing dandruff and dirt from the hair by means of suction, and is intended especially for use on longer hair, such as a woman's, where it would be desirable to clean the hair with as little mussing or disorder as possible.

A further object of the invention is to provide means also, and at the same time, for removing dandruff from the scalp.

A further object of the invention is to provide a suction head having a comb fitting over the mouth thereof, the comb being forked and so designed that when it is passed through the hair, it will separate the hair into thin wide strands, each of these strands being subjected to the full suction of the device, as it passes through the inner space between the forks.

A further object of the invention is to provide means by which the comb, in addition to subjecting the hair to the full suction effect, will also reach through to the scalp and thoroughly clean the scalp during one and the same operation.

The invention consists of the novel construction and arrangement of the parts and combination of parts hereinafter more fully set forth in the following specification and pointed out in detail in the appended claims.

In the accompanying drawings:

Figure 13 is a greatly enlarged bottom plan view of a portion of the comb, illustrating a still further modification.

Figure 14 is a rear view of a portion of this comb.

Figure 15 is a side view of a portion of this comb.

Figure 16 is a side elevation of a still further modification of both the comb and holder.

Figure 17 is a rear end view of Figure 16.

Figure 18 is a section on the line 18—18 of Figure 16.

Figure 19 is a section on the line 19—19 of Figure 17.

Figure 20 is an enlarged view of a section of the comb.

Figure 1:
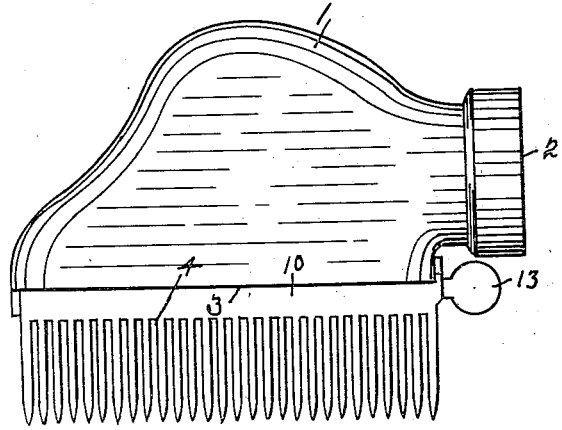
Figure 1 is a side elevation of my invention.
Figure 2:
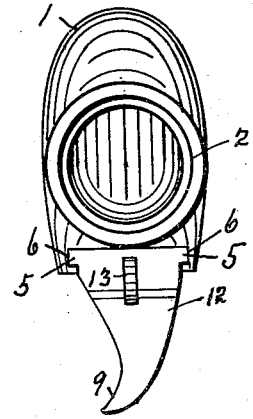
Figure 2 is an end elevation of the same.
Figure 3:
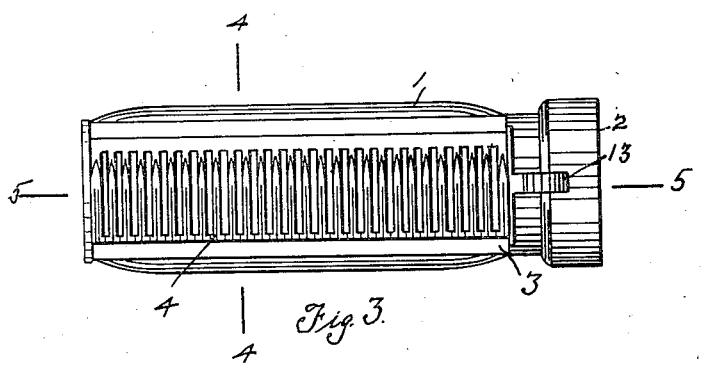
Figure 3 is a bottom plan view of Figure 1.
Figure 4:
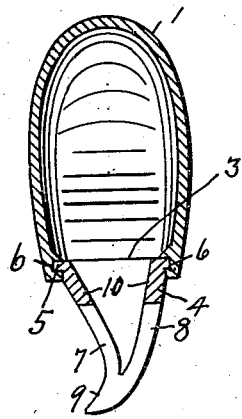
Figure 4 is a section on the line 4—4 of Figure 3.
Figure 5:
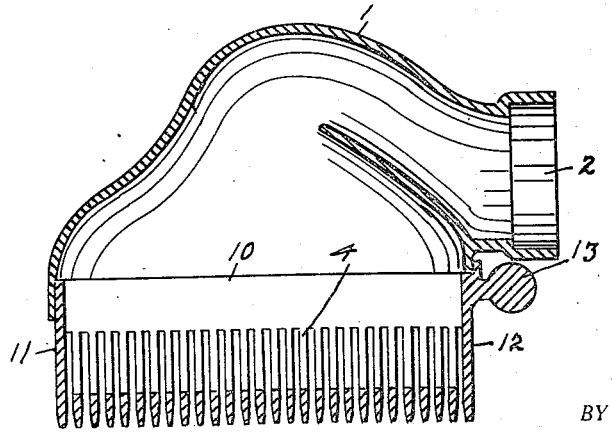
Figure 5 is a section on the line 5—5 of Figure 3.
Figure 6:
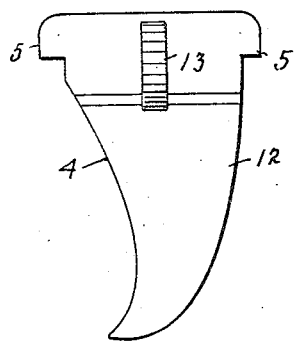
Figure 6 is a detail enlarged end view of the comb.

Referring to the accompanying drawings, forming part of this specification, and in which like reference numerals designate like parts throughout the several views thereof, I designates the suction head formed of light metal, or other suitable material, having an opening 2 for coupling with a suitable suction-producing mechanism, and a mouth 3 completely covered by a special comb 4. This special comb is provided with flanges 5 on its upper side adapted to fit in the slots 6 in the head, to make a tight connection therewith, as shown in section in Figure 4. This comb 4 is formed of two parts, 7 and 8, converging and formed into teeth 9 which are joined together at their lower ends. This provides a comb in which every tooth is forked directly above the tip to provide an open space within the comb. The slots between the teeth 9 extend a predetermined distance and are terminated to allow the solid sides 10 at the top adjoining the flanges 5. Both ends of the comb are closed by solid teeth 11 and 12, and a handle 13 is provided for inserting and withdrawing the comb in the suction head. It is obvious that other methods of attaching the comb to the suction head could be provided without departing from the spirit of my invention.

Figure 7:
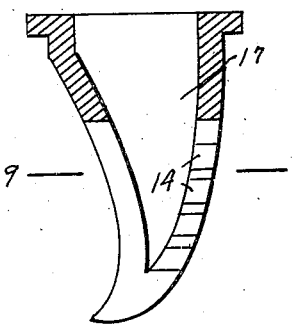
Figure 7 is an enlarged sectional view of the comb, showing a modification of the teeth.
Figure 8:
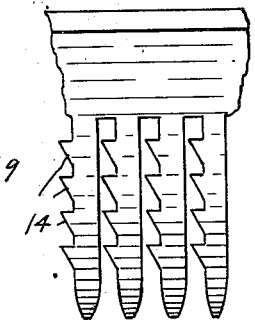
Figure 8 is a rear view of a portion of the comb, illustrating the modified form of teeth shown in Figure 7.

In Figure 7 is shown one tooth of a section of the comb in which the rear fork is provided with special projections 14 for the purpose of extracting any particles of foreign matter in the hair as it passes between the teeth. In this modification, the space between the front forks 15 of the teeth is greater than the space between the rear forks 16 in order to compress the hair as it passes between the rear teeth and aid in extracting foreign particles from the hair and into the open space 17 between the front and rear forks of the teeth where these particles will be drawn off by the suction.

Figure 10:
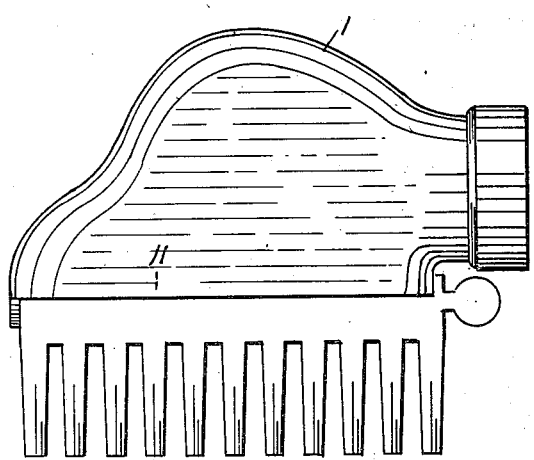
Figure 10 is another view of my invention, showing a further modification of the comb.
Figure 9:
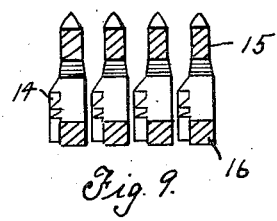
Figure 9 is a section on the line 9—9 of Figure 7.
Figure 11:
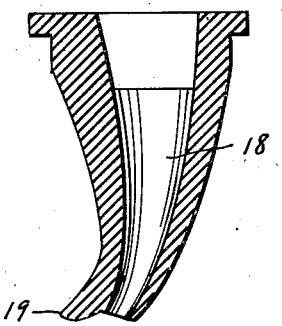
Figure 11 is an enlarged section of the comb taken on the line 11—11 of Figure 10.

The modification of my invention shown in Figure 10 has teeth hollow throughout, as shown in section in Figure 11. The interior opening 18 graduates from a small area at the tip of the teeth to a larger areas at the top. These teeth are provided with sharpened tips 19 for separating the hair as an aid in passing through it.

Figure 12:
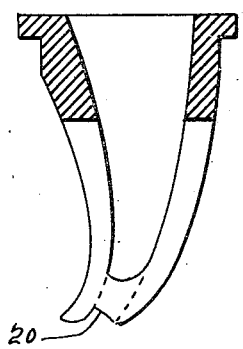
Figure 12 is a view in section, showing a further modification of the tooth illustrated in Figure 11.

In Figure 12 is a further modification of the special tooth combining the features of both the modification and the special tooth previously described. This is a forked tooth provided with an opening 20 at the tip.

In Figures 13, 14 and 15, I have shown a further modification of my invention which is a preferred design for the special comb. In this comb the front fork 21 of the tooth terminates at the point 22 and is joined thereat to the rear fork 23, an opening 24 being provided between these forks. The rear fork 23 is provided with projections 25 for the purpose previously described. Also, the bottom end of the rear fork 23 is rounded at 26 and slightly farther to the rear is attached the tuft of bristles 27. These bristles 27 could be flat at the bottom 28 or rounded as shown at 29 in Figure 14.

In Figures 16, 17, 18, 19 and 20, I have shown a modified suction head 30, provided with a handle 31. The special comb 32 is also modified by having a broader tip and is supplied with multiple openings 33.

To use the device, the head 1 is attached to the proper suction-producing mechanism, and after this has been started, the suction head is grasped at the top by the hand and is drawn over the head with the teeth of the comb 4 passing through the hair. If the comb, as first described, is used and it is only desired to clean the hair without the scalp, there is no necessity in keeping the tips in contact with the scalp, and the hair is combed its full length at each stroke. As the hair passes between the special teeth of the comb, it is important that the hair completely fill the space between the teeth, thus closing all openings through which air can enter the suction head through the special comb. This will consequently subject the hair, when it passes between the forks of the comb, to the full suction for the purpose of removing dirt and dandruff therefrom.

In my modification, Figures 10 and 11, the purpose would be to clean the scalp and the comb would be passed through the hair, keeping the tips of the teeth in contact with the scalp for the purpose of loosening and removing the dandruff through the openings 18.

If the preferred comb, shown in Figures 13, 14 and 15 were used, the hair and scalp would both be cleaned at the same operation. To use this comb, the suction head 1 is grasped in the hand and the comb drawn through the hair, keeping the tips of the teeth in contact with the scalp throughout each stroke. The hair itself would be cleaned, as before described, while the scalp would be subjected to both the scraping effect of the projections 26 and brushing by the bristles 27 as they pass through each pathway opened by the teeth, the dandruff thus loosened being drawn off through the openings 24. The pressure with which the projections 26 and the bristles 27 are applied to the scalp should, of course, be made lightly enough so as not to irritate the scalp. It can readily be seen that by passing this comb through the hair repeatedly, as just described, every portion of the scalp and all of the hair would be reached, thus affording thorough dry cleaning of the scalp and hair.

The modification of my invention shown in Figures 16, 17, 18, 19 and 20 would be used in exactly the same manner except that the suction head could be held by the handle.

As it is necessary, in order to secure the proper suction effect, that the teeth of the comb project completely into the hair, it might be advisable to provide a movable shutter resting on the outside of the teeth so that the portion of the teeth permitted to enter the hair could be regulated and that portion of the teeth above this line completely covered to prevent air from entering into the vacant spaces between the teeth, with a consequent reduction of the suction on the hair. It is obvious that instead of using one comb with bifurcated teeth, two combs could be used with the tips of their teeth abutting.

Having thus described my invention, what I claim is:

1. The combination with a suction head adapted to be connected to a suitable suction-producing mechanism and having a groove on each side of its mouth extending lengthwise thereof, and a comb having divided teeth connected at their upper ends and each pointed and joined at its lower end, said comb having a flange on each side at its upper edge adapted to slide in and out of the grooves on the side of the mouth of the suction head.

2. The combination with a suction head adapted to be connected to a suitable suction-producing mechanism, and a comb having bifurcated teeth connected at their free ends to leave a continuous open space through the teeth the length of the comb, said comb being removably secured to the suction head with the open space in the comb over the open space in the suction head.

3. The combination with a suction head adapted to be connected to a suitable suction-producing mechanism, and a comb adapted to be held over the mouth of said suction head and having integral divided teeth converging from opposite sides of the opening in the suction head and joined at their opposite ends.

4. The combination with a suction head adapted to be connected to a suitable suction-producing mechanism, and a comb having integral bifurcated teeth symmetrically arranged in a series with their free ends connected and the open spaces in the teeth adjacent one to the other.

5. The combination with a suction head adapted to be connected to a suitable suction-producing mechanism, and a comb having hollow wedge-shape teeth with separate openings in their wedge-shape sides and points, and the teeth arranged symmetrically in a series to present unperforated front and rear surfaces.

6. The combination with a suction head adapted to be connected to a suitable suction-producing mechanism and having a mouth therein, and a comb removably secured in said head and having serrated teeth.

GEORGE A. SMITH.